(12) United States Patent
Kallio (10) Patent No.: US 9,403,592 B2
(45) Date of Patent: Aug. 2, 2016

(54) TWO-STAGE SECONDARY PISTON FOR LANDING GEAR

(71) Applicant: Goodrich Corporation, Charlotte, NC (US)

(72) Inventor: Jeremy Daniel Kallio, Tallmadge, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/293,267

(22) Filed: Jun. 2, 2014

(65) Prior Publication Data

US 2015/0344131 A1  Dec. 3, 2015

(51) Int. Cl.
| | | |
|---|---|---|
| *F16F 9/48* | (2006.01) | |
| *B64C 25/58* | (2006.01) | |
| *F16F 9/06* | (2006.01) | |
| *B64C 25/60* | (2006.01) | |

(52) U.S. Cl.
CPC .................. *B64C 25/58* (2013.01); *B64C 25/60* (2013.01); *F16F 9/068* (2013.01)

(58) Field of Classification Search
CPC ................. F16F 9/50; F16F 9/48; F16F 9/49; F16F 9/486; F16F 9/585; F16F 9/512; F16F 9/0209; B60G 17/044; B64C 25/60
USPC ......................................................... 188/284
See application file for complete search history.

(56) References Cited

U.S. PATENT DOCUMENTS

| | | | | |
|---|---|---|---|---|
| 3,056,598 | A * | 10/1962 | Ransom .................. | B64C 25/60 267/64.26 |
| 4,312,499 | A * | 1/1982 | Wossner et al. ................ | 267/226 |
| 4,328,960 | A * | 5/1982 | Handke et al. ................. | 267/226 |
| 4,445,672 | A * | 5/1984 | Turiot .......................... | 267/64.16 |
| 5,102,109 | A * | 4/1992 | Schnetz .................. | F16F 9/512 188/282.1 |
| 8,181,756 | B2 * | 5/2012 | Horikawa ............... | F16F 9/182 188/281 |

FOREIGN PATENT DOCUMENTS

| | | | | | |
|---|---|---|---|---|---|
| CH | 303008 | A * | 11/1954 | ................ | F16F 9/36 |
| DE | 1755711 | U * | 11/1957 | | |
| DE | 2445240 | A1 * | 4/1976 | ................ | F16F 9/48 |
| EP | 1593874 | A1 * | 11/2005 | ........... | B60G 15/061 |
| GB | 2008716 | A * | 6/1979 | ........... | B60G 15/061 |

* cited by examiner

*Primary Examiner* — Anna Momper
*Assistant Examiner* — Stephen Bowes
(74) *Attorney, Agent, or Firm* — Snell & Wilmer, L.L.P.

(57) ABSTRACT

A shock strut is disclosed. The shock strut may have multiple pistons and multiple chambers. In this manner, the shock strut may compress different lengths for different applied forces at different points during its stroke.

11 Claims, 5 Drawing Sheets

TWO-STAGE SECONDARY PISTON FOR LANDING GEAR

FIELD

The present disclosure relates to landing gear systems and, more specifically, to a two-stage secondary piston for landing gear.

BACKGROUND

Aircraft landing gear often have shock-absorbing pistons to cushion landing and ground operations. Landing gear pistons often must absorb significant energy during landings, yet also provide firm ground handling during lower speed operations, such as taxiing. Often however, the stroke length necessary to absorb landing energy often causes soft handling during lower speed operations.

SUMMARY

A shock strut is disclosed. A shock strut may have a cylinder and a piston disposed radially inward of the cylinder and configured to travel axially within the cylinder. The piston may travel in response to the shock strut being in at least one of a first stage region, a transition region or a secondary stage region. The piston may also include an outer secondary piston configured to travel axially inward in response to the shock strut being in at least one of the transition region and the secondary stage region, and an inner secondary piston configured to travel axially inward in response to the shock strut being in the secondary stage region.

A method of operating a shock strut is disclosed. A method of operating a shock strut may include applying a first compression force to a piston. The method may further include compressing the shock strut wherein the compressing includes translating the piston axially inward relative to a cylinder, and transferring the first compression force to a fluid disposed within a primary chamber. Moreover, the method may include expelling the fluid from an orifice in response to the transferring. The method may further include contacting an engagement strike plate by the piston, translating the engagement strike plate axially inward relative to the cylinder in response to the contacting, and translating an outer secondary piston axially inward relative to the cylinder in response to the translating the engagement strike plate.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

With reference to FIG. 1-4, in various embodiments, a shock strut 2 may comprise cylinder 1 containing gas and/or hydraulic oil. The shock strut 2 may further comprise a piston configured to translate into ("instroke") and out of ("outstroke") the cylinder (collectively, to "stroke"). As the shock strut 2 strokes, fluid (liquid and/or gas) is transferred among various chambers, absorbing the energy imparted by the stroking, due to friction and viscosity of the fluid as well as due to reaction forces resulting from the compression of a gas.

Figure 1:
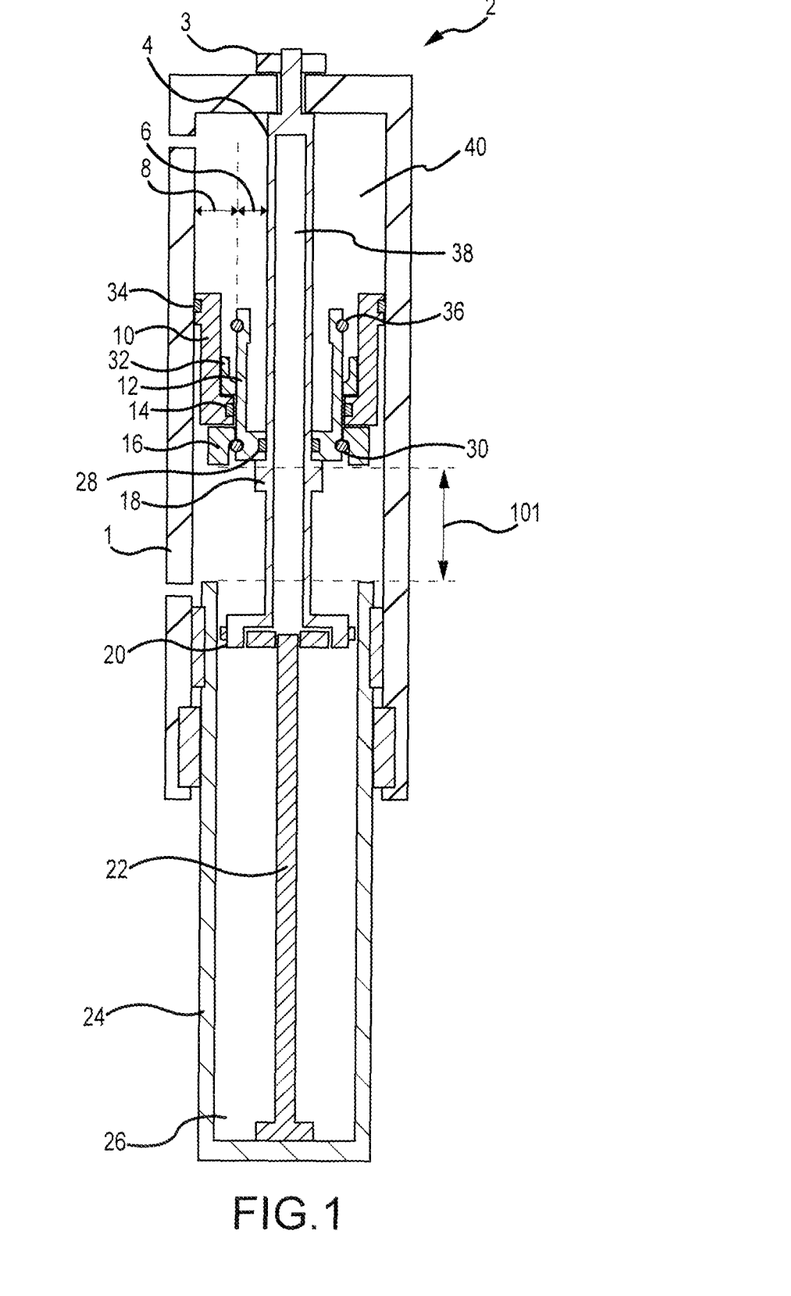
FIG. 1 illustrates a cut away view of various aspects of a two-stage secondary piston for landing gear, at a fully extended position, in accordance with various embodiments.
Figure 2:
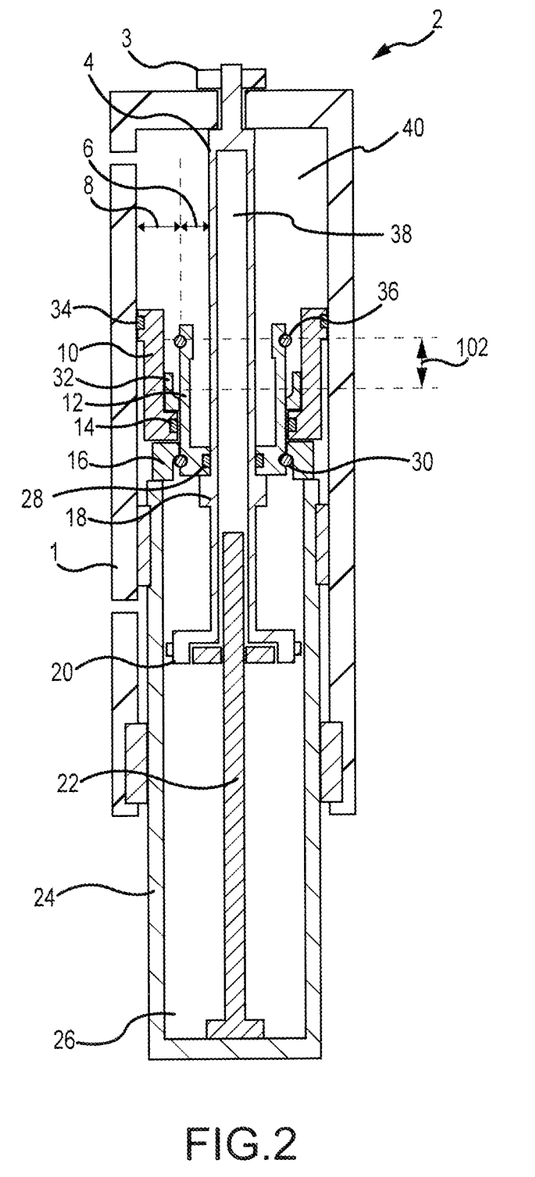
FIG. 2 illustrates a cut away view of various aspects of a two-stage secondary piston for landing gear, at the end of the first stage region of operation and beginning of the transition stage of operation, in accordance with various embodiments.
Figure 3:
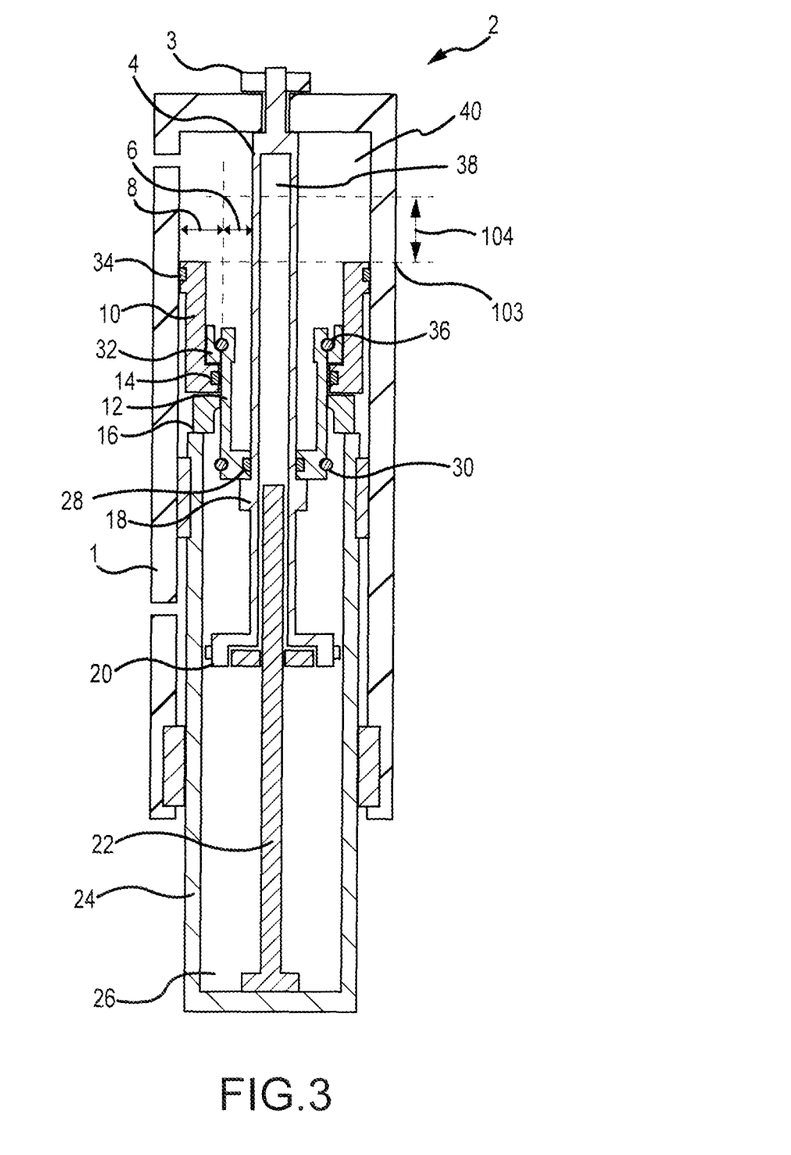
FIG. 3 illustrates a cut away view of various aspects of a two-stage secondary piston for landing gear, at the end of the transition stage of operation and beginning of the secondary stage region of operation, in accordance with various embodiments.
Figure 4:
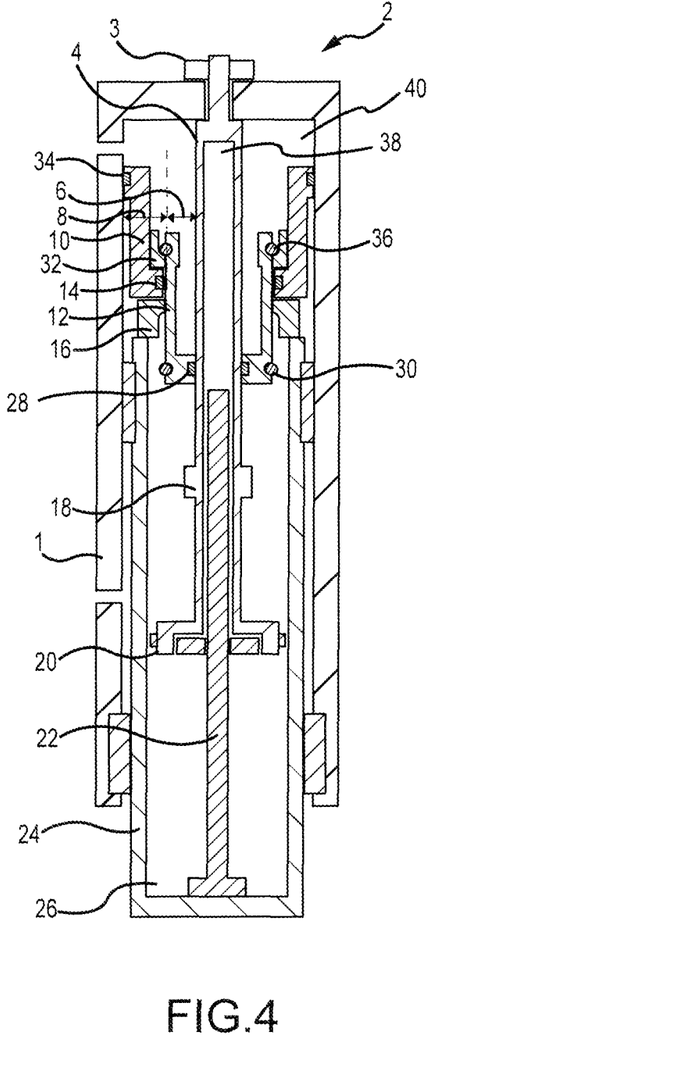
FIG. 4 illustrates a cut away view of various aspects of a two-stage secondary piston for landing gear, at a fully compressed position, in accordance with various embodiments.
Figure 5:
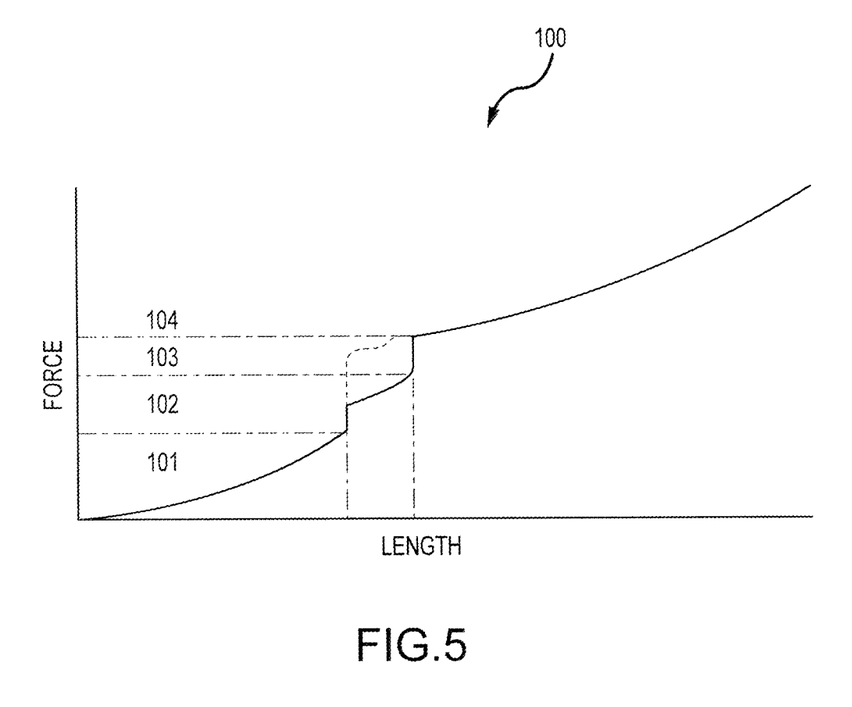
FIG. 5 illustrates a chart depicting a graph of a force to length ratio for an example two-stage secondary piston operating in different stages, in accordance with various embodiments.

A shock strut 2 may comprise a cylinder 1 and a piston 24. The piston 24 may be disposed radially inward of the cylinder 1 and may travel axially within the cylinder 1. As the piston 24 travels axially within the cylinder 1, the piston 24 may enter various operating regions where different components of the piston 24 and different components of the cylinder 1 interact in various ways. For example, with reference to FIGS. 1 and 5, a piston 24 may travel axially within the cylinder 1 through a first stage region 101. With reference to FIGS. 2 and 5, a piston 24 may travel axially within the cylinder 1 through a transition region 102 axially inward of the first stage region 101 until the piston 24 reaches the configuration according to FIG. 3. With reference to FIGS. 3 and 5, a piston 24 may travel axially within the cylinder 1 through a secondary stage region 104 axially inward of the transition region 102 until the piston 24 reaches the configuration of FIG. 4. FIG. 4 illustrates the configuration of the piston 24 when it reaches full compression. As the piston 24 travels through these different regions, different operational characteristics may be exhibited. For example, the first stage region 101 may provide the piston 24 with a longer stroke length and/or require a different amount of force to cause the piston 24 to compress a given distance at a given rate, than another region, for example, the transition region 102 and/or the secondary stage region 104. An embodiment of these different operational characteristics is illustrated as a curve showing applied compressive force on the y axis vs. shock strut 2 length on the x axis in FIG. 5. As FIG. 5 illustrates, in various embodiments, the relationship between compressive force and shock strut length is nonlinear and may comprise one or more inflection points as piston 24 travels from first stage region 101 to secondary stage region 104. The piston 24 may translate a first distance in response to a first compression force in the first stage region 101, and may translate a second distance in response to a second compression force in the secondary stage region 104. The ratio of the second compression force to the second translation distance may be greater than the ratio of the first compression force to the first translation distance. Stated another way, the amount of compressive force per unit of shock strut 2 length may vary from first stage region 101 to secondary stage region 104. For example, during sudden extension of the shock strut 2, going from secondary stage region 104 toward first stage region 101, the amount of compressive force per unit of shock strut 2 length may decrease progressively, ameliorating the impulse loading on various landing gear components.

With renewed reference to FIG. 1-4, the cylinder 1 may comprise various components. For example, the cylinder 1 may comprise a hollow circular tube having various components disposed within. For example, a cylinder 1 may comprise a nut 3, a secondary chamber 40, and an orifice support tube 4 comprising a gas spring chamber 38. The orifice support tube 4 may be positioned centrally with the cylinder 1 and extend axially along the length of the cylinder 1. The gas spring chamber 38 may be disposed within the orifice support tube 4, and as discussed later herein, a gas spring chamber metering pin 22 of the piston 24 may extend inwardly into the gas spring chamber 38. The orifice support tube 4 may be securely mounted in position via a nut 3. Finally, the secondary chamber 40 may comprise a void disposed annularly outward of the gas spring chamber 38 and annularly inward of the cylinder 1, thus lying between the gas spring chamber 38 and the cylinder 1. As the shock strut 2 operates, the piston 24 and various components of the piston 24, such as the inner secondary piston 12 and the outer secondary piston 10 may travel axially into and out of the secondary chamber 40, thus decreasing and increasing the volume of the secondary chamber 40, respectively.

The piston 24 may also comprise a hollow circular tube. The piston 24 may be disposed partially within the cylinder 1 and may extend out from it. The piston 24 may comprise various components. For example, the piston 24 may comprise a gas spring chamber metering pin 22, a primary chamber 26, an outer secondary piston 10, an inner secondary piston 12, an engagement strike plate 16, and a floor strike plate 32. The gas spring chamber metering pin 22 may be positioned centrally with the piston 24 and extend axially along the internal length of the piston 24 toward the cylinder 1. The gas spring chamber metering pin 22 may extend inwardly into the gas spring chamber 38 of the orifice support tube 4, and may exert a compression force on the gas therein as the piston 24 translates into the cylinder 1 when compressed, and may exert an expansion force on the gas therein as the piston 24 translates out of the cylinder 1 when extended. The primary chamber 26 may comprise a void disposed annularly outward of the gas spring chamber metering pin 22 and annularly inward of the piston 24. The volume of the primary chamber 26 may be defined by the position of piston 24 relative to an orifice 20 discussed further herein. An engagement strike plate 16 may comprise an annulus encircling the inner secondary piston 12 and axially slidable along the inner secondary piston 12, but retained in communication with the inner secondary piston 12 by a floor retaining ring 36, and an outer engagement retaining ring 30, discussed further herein. The engagement strike plate 16 may provide a resting surface whereupon the impact of the piston 24 upon the outer secondary piston 10 may be buffered. Similarly the floor strike plate 32 may comprise an annulus encircling the inner secondary piston 12 and axially slidable along the inner secondary piston 12, but retained in communication with the inner secondary piston 12 by a floor retaining ring 36, and an outer engagement retaining ring 30, discussed further herein. The floor strike plate 32 may provide a resting surface whereupon the impact of the outer secondary piston 10 upon the inner secondary piston 12 may be buffered.

Turning in detail to various components of the cylinder 1, a nut 3 may comprise a threaded nut disposed externally of the cylinder 1. The gas spring chamber 38 may have a threaded portion extending through a face of the cylinder 1 and externally of the cylinder 1. The nut 3 may thus engage the gas spring chamber 38 and retain it in both radial and axial directions relative to the cylinder 1.

The cylinder 1 may comprise an orifice support tube 4. The orifice support tube 4 may comprise a cylindrical member disposed at the center of the cylinder 1 and extending axially along the central axis of the cylinder 1. The orifice support tube 4 may be the annularly innermost component of the cylinder 1 and may extend toward the piston 24. With particular reference to FIG. 1, and FIG. 4, the orifice support tube 4 may extend sufficiently far so that the gas spring chamber metering pin 22 is disposed within the gas spring chamber 38 of the orifice support tube 4 at all configurations of the shock strut 2, whether fully compressed (FIG. 4), or fully extended (FIG. 1).

The orifice support tube 4 may comprise a gas spring chamber 38. The gas spring chamber 38 of the orifice support tube 4 may comprise a cavity whereupon the gas spring chamber metering pin 22 extends. A gas, such as nitrogen, or compressed air, or any other suitable gas having desired nonreactivity, density, and other properties may be incorporated. The gas spring chamber metering pin 22 articulates a greater axial distance into the cavity as the piston 24 compresses into the cylinder 1 (compare FIG. 1 and FIG. 4). In this manner, the gas spring chamber 38 and the gas spring chamber metering pin 22 may provide a rebounding spring force whereby compressive forces may be reacted, such as upon rapid compression such as during landing. Moreover, in various embodiments the gas spring chamber 38 may be in fluid communication with primary chamber 26. In this manner, fluid from primary chamber 26 (in addition to the gas spring chamber metering pin 22) may travel axially into the gas spring chamber 38. However, in further embodiments, the gas spring chamber 38 is not in fluid communication with primary chamber 26.

The orifice support tube 4 may further comprise an orifice 20 disposed at its distal end (e.g., the end axially nearest to the piston 24). The distal end of the orifice support tube 4 may be flared, so that the orifice support tube 4 widens annularly, thus extending near to the piston 24. An orifice 20 may comprise an aperture disposed between the distal end of the orifice support tube 4 and the piston 24. As the piston 24 articulates within the cylinder 1, fluid may travel through the orifice 20. In this manner, the orifice 20 may be sized to meter the flow of gas and/or liquid into and out of a primary chamber 26 of the piston 24 in order to achieve a desired compression rate at a given position and compression force. Thus, in various embodiments, the orifice support tube 4 carries at least a portion of the compressive load during an instroke event.

The orifice support tube 4 may further comprise a first stage limit shelf 18. A first stage limit shelf 18 may comprise a thickened annulus integrally disposed about the circumference of the orifice support tube 4 and providing a translational stop to the inner secondary piston 12. The first stage limit shelf 18 may block the travel of the inner secondary piston 12 annularly outward from the cylinder 1. Thus, during an outstroke event, the inner secondary piston 12 may be limited in its travel by the first stage limit shelf 18. Thus, the first stage limit shelf 18 may establish the stroke position at which the shock strut 2 changes from operating in the first stage region 101, to operating in the transition region 102.

The cylinder 1 may also comprise a secondary chamber 40. As the piston 24 moves axially inward relative to the cylinder 1, the piston 24 may further engage with the outer secondary piston 10 and articulate it inward as well. As the outer secondary piston 10 moves inward relative to the cylinder 1, it may further engage the inner secondary piston 12 and move it as well. Thus, one may appreciate that as the piston 24 moves progressively inward, first the outer secondary piston 10 and then the inner secondary piston 12 are also engaged and move inward as well, thus changing the amount of force required to cause the piston 24 to compress a given distance at a given rate. Because the outer secondary piston 10 is engaged, then the inner secondary piston 12 is engaged, the volume of the secondary chamber 40 is progressively decreased by a greater amount for every inch of compression of the shock strut 2. In this manner, the shock strut 2 may be said to have different compression "stages" or "stage regions" or "stage(s) of operation." In other words, depending on how far the shock strut 2 is compressed, it may operate according to different characteristics.

Having discussed various components of the cylinder 1, attention is directed to various components of the piston 24. The piston 24 may comprise a gas spring chamber metering pin 22. The gas spring chamber metering pin 22 may comprise a cylindrical shaft extending inwardly toward the cylinder 1 from the piston 24. As previously discussed, as the piston 24 articulates, the gas spring chamber metering pin 22 also articulates in correspondence with the piston 24.

The piston 24 may comprise a primary chamber 26. The primary chamber 26 may comprise a void within the piston 24. As the piston 24 moves axially inward relative to the cylinder 1, the volume of the primary chamber 26 is decreased coincident with the relative positioning of the piston 24 to the flared distal end of the orifice support tube 4. Thus, as the volume of the primary chamber 26 is decreased, fluid is forced to flow from the primary chamber 26 through the orifice 20. Similarly, as the piston 24 moves axially outward relative to the cylinder 1, the volume of the primary chamber 26 is increased, so that fluid is forced to flow into the primary chamber 26 through the orifice 20. In this manner, the primary chamber 26 may provide a resistive dampening force whereby rapid impulse loads may be dampened over time.

The piston 24 may also comprise an outer secondary piston 10. The outer secondary piston 10 may engage during different stages of operation and may interact with the secondary chamber 40 to provide different operating characteristics. The outer secondary piston 10 may comprise a first outer secondary piston seal 14, a second outer secondary piston seal 34, and a primary surface area 8. The outer secondary piston 10 may comprise a unitary body disposed within the cylinder 1 and annularly between the cylinder 1 and the inner secondary piston 12.

In various embodiments, the piston 24 comprises an engagement strike plate 16. An engagement strike plate 16 may comprise an annulus encircling the inner secondary piston 12 and axially slidable along the inner secondary piston 12, but retained in communication with the inner secondary piston 12 by a floor retaining ring 36, and an outer engagement retaining ring 30, discussed further herein. The engagement strike plate 16 may provide a resting surface whereupon the impact of the piston 24 upon the outer secondary piston 10 may be buffered.

Similarly, the piston 24 comprises a floor strike plate 32. The floor strike plate 32 may comprise an annulus encircling the inner secondary piston 12 and axially slidable along the inner secondary piston 12, but retained in communication with the inner secondary piston 12 by a floor retaining ring 36, and an outer engagement retaining ring 30, discussed further herein. The floor strike plate 32 may provide a resting surface whereupon the impact of the outer secondary piston 10 upon the inner secondary piston 12 may be buffered.

Now having discussed various aspects of a piston 24, attention is directed in detail to the outer secondary piston 10 of the piston 24. The outer secondary piston 10 may comprise a primary surface area 8. The primary surface area 8 may be the area of the outer secondary piston 10 in fluid communication with the secondary chamber 40. This primary surface area 8 may exert a force on a liquid and/or gas within the secondary chamber 40 as the outer secondary piston 10 translates axially.

The outer secondary piston 10 may comprise a first outer secondary piston seal 14. A first outer secondary piston seal 14 may comprise a seal disposed circumferentially inward of a portion of the outer secondary piston 10, and may lie between the outer secondary piston 10 and the orifice support tube 4. As a result, fluid may be prevented from leaking from within the secondary chamber 40 at the point where the outer secondary piston 10 contacts the orifice support tube 4 as it translates axially inward and outward.

The outer secondary piston 10 may comprise a second outer secondary piston seal 34. A second outer secondary piston seal 34 may comprise a seal disposed circumferentially outward of a portion of the outer secondary piston 10, and may lie between the outer secondary piston 10 and the cylinder 1. As a result, fluid may be prevented from leaking from within the secondary chamber 40 at the point where the outer secondary piston 10 contacts the cylinder 1.

Now having discussed various aspects of an outer secondary piston 10 of the piston 24, attention is directed in detail to various aspects of an inner secondary piston 12 of the piston 24. The inner secondary piston 12 may comprise a secondary surface area 6. The secondary surface area 6 may be the area of the outer secondary piston 10 in fluid communication with the secondary chamber 40. This secondary surface area 6 may exert a force on a liquid and/or gas within the secondary chamber 40 as the inner secondary piston 12 translates axially.

The inner secondary piston 12 may comprise a first inner secondary piston seal 28. A first inner secondary piston seal 28 may comprise a seal disposed circumferentially inward of a portion of the inner secondary piston 12, and may lie between the inner secondary piston 12 and the orifice support tube 4. As a result, fluid may be prevented from leaking from within the secondary chamber 40 at the point where the inner secondary piston 12 contacts the orifice support tube 4 as it translates axially inward and outward.

The inner secondary piston 12 may comprise an outer engagement retaining ring 30. As discussed elsewhere herein, the outer engagement retaining ring 30 may comprise a annulus disposed circumferentially outward of a portion of the inner secondary piston 12 and preventing the inner secondary piston 12 from becoming separated from the engagement strike plate 16, the outer secondary piston 10, and the floor strike plate 32, which are stacked together and annularly disposed about the inner secondary piston 12 in order from the outer engagement retaining ring 30, axially inward toward the cylinder 1.

Similarly, the inner secondary piston 12 may comprise a floor retaining ring 36. As discussed elsewhere herein, the floor retaining ring 36 may comprise a annulus disposed circumferentially outward of a portion of the inner secondary piston 12 and preventing the inner secondary piston 12 from becoming separated from the floor strike plate 32, the outer secondary piston 10, and the engagement strike plate 16, which are stacked together and annularly disposed about the inner secondary piston 12 in order from the outer engagement retaining ring 30, axially outward toward the cylinder 1.

Thus, in various embodiments, the floor retaining ring 36 is disposed at an axially inward portion of the inner secondary piston 12 (e.g., toward the cylinder 1) and the outer engagement retaining ring 30 is disposed at an axially outward portion of the inner secondary piston 12 (e.g., toward the piston 24).

Thus as one can appreciate, the primary surface area 8 of the outer secondary piston 10 and the secondary surface area 6 of the inner secondary piston 12 may be designed according to various ratios in order to effect different behaviors. In various embodiments, the ratios of the volumes of various reservoirs/cavities may be designed differently to effect different behaviors.

For example, the stroke of an outer secondary piston 10 during a compression event multiplied by the surface area of the outer secondary piston 10 in contact with the secondary chamber 40 during a compression event comprises a secondary chamber 40 stroke volume of the outer secondary piston 10 (V1). The stroke of an inner secondary piston 12 during a shrink event multiplied by the surface area of the inner secondary piston 12 in contact with the secondary chamber 40 during a shrink event comprises a secondary chamber 40 stroke volume of the inner secondary piston 12 (V2). In various embodiments, V1 is greater than V2, so that the outer secondary piston 10 may react a greater force with the secondary chamber 40 during a shrink event for a given stroke distance. In various embodiments, V2 is greater than V1, so that the inner secondary piston 12 may react a greater force with the secondary chamber 40 during a shrink event for a given stroke distance. In various embodiments, V1 and V2 may be equal or may comprise any ratio. This means that the overall available volume of secondary chamber 40 decreases during a shrink event as the outer secondary piston 10, then the inner secondary piston 12 progressively translates axially inward. In various embodiments, the surface area 6 of the inner secondary piston 12 is greater than the surface area 8 of the outer secondary piston 10, so that the inner secondary piston 12 may react a greater force with the secondary chamber 40 during a shrink event for a given stroke distance. In various embodiments, the surface area 8 and the surface area 10 may be equal or may comprise any ratio. In this manner, the force required to compress the shock strut 2 a given distance in each stage of operation may be different.

Now having discussed various components of a shock strut 2, a shock strut 2 may operate according to various methods, and may operate in different compression regions. For example, a shock strut 2 may be in a fully extended position, such as that illustrated in FIG. 1. This position is the beginning position of first stage region 101. An external compressive force may be exerted on piston 24, sufficient to cause the shock strut 2 to compress. As the shock strut 2 compresses, the piston 24 translates axially inward relative to the cylinder 1. As the piston 24 translates, the compressive force is transferred to a fluid within the primary chamber 26. The fluid is forced out of orifice 20 as the piston 24 translates axially inward. As the piston 24 translates inward, the piston 24 contacts the engagement strike plate 16. This moment is illustrated in FIG. 2.

The piston 24 may continue to compress; however, because the piston 24 is in contact with the engagement strike plate 16, the engagement strike plate 16 also translates axially inward in response to the axially inward translation of the piston 24. Because the engagement strike plate 16 is in contact with the outer secondary piston 10 this causes the outer secondary piston 10 to also translate axially inward. The shock strut 2 is now operating in the transition region 102. As the outer secondary piston 10 translates axially inward, it exerts a compression force on the fluid within the secondary chamber 40. More specifically, the primary surface area 8 of the outer secondary piston 10 is in contact with the fluid and exerts a compression force on it. As a result, both the primary chamber 26 and the secondary chamber 40 absorb a portion of the compressive force. The fluid within the secondary chamber 40 may be forced through a second orifice.

The piston 24 may continue to compress, however, the outer secondary piston 10 may translate axially inward until the floor strike plate 32 contacts the floor retaining ring 36 of the inner secondary piston 12. At this point, the piston 24 has reached the transition boundary 103 (FIGS. 3 and 5). The transition boundary 103 is depicted in FIG. 3, and is the position in the stroke length of the piston 24 at which the outer secondary piston 10 causes the inner secondary piston 12 to begin translating axially inward relative to the cylinder 1. Because the floor strike plate 32 is pushed to be in mechanical contact with the floor retaining ring 36, force is transferred from the outer secondary piston 10 to the inner secondary piston 12. The shock strut 2 is now operating in the secondary stage region 104.

As the outer secondary piston 10 and the inner secondary piston 12 now both translate axially inward, they exert a compression force on the fluid within the secondary chamber 40. More specifically, the primary surface area 8 of the outer secondary piston 10 is in contact with the fluid and exerts a compression force on it and the secondary surface area 6 of the inner secondary piston 12 is in contact with the fluid and exerts a compression force on it. As a result, both the primary chamber 26 and the secondary chamber 40 absorb a portion of the compressive force. However, because both the primary surface area 8 and the secondary surface area 6 exert a compression force on the fluid within the secondary chamber 40, the secondary chamber 40 may now exert a greater reaction force on the combination of the outer secondary piston 10 and the inner secondary piston 12, than when the outer secondary piston 10 was translating separately from the inner secondary piston 12. The fluid within the secondary chamber 40 may be forced through a second orifice.

Thus, in this manner, the shock strut 2 may have a first stage region 101, a transition region 102, and a secondary stage region 104. A different amount of external force may cause a different amount of compression in these different stages. The shock strut 2 may also have a transition boundary 103. For example, FIG. 5 shows various amounts of external force and various lengths of compression in these different stages. Thus, one may appreciate that a shock strut 2 may operate in different domains during different times. For example, a shock strut 2 may operate in the first stage region 101, then optionally the transition region 102, then optionally the secondary stage region 104 (transiting the transition boundary 103 between the transition region 102 and the secondary stage region 104) in response to a large impact force such as that imparted on an aircraft landing gear during a landing. In this manner, a long stroke length may be provided and the shock strut 2 may grow increasingly difficult to stroke as the shock strut 2 compresses through the various regimes. This may decelerate the landing impact more gradually, resulting in a smoother landing.

However, once on the ground, a shock strut 2 may settle into one or more stages. For example, a shock strut 2 may settle into a secondary stage region 104. Because the various surface areas may be sized variously, stiffer ground handling and thus more effective steering may be provided in secondary stage region 104.

Now, having described various components of various exemplary shock strut systems, a shock strut may be manufactured from various materials. In one exemplary embodiment, a shock strut system may comprise metal. For example, a shock strut may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having a desired strength, stiffness, or flexibility sufficient to maintain resiliency during use. In various embodiments, various portions of shock strut systems as disclosed herein are made of different materials or combinations of materials, and/or may comprise coatings.

In various embodiments, a shock strut may comprise multiple materials, or any material configuration suitable to enhance or reinforce the resiliency and/or support of the shock strut when subjected to wear in an aircraft operating environment or to satisfy other desired electromagnetic, chemical, or physical properties, for example radar signature, load capacity, stroke length, rigidity, or heat tolerance.

In various embodiments, while the shock struts described herein have been described in the context of aircraft applications; however, one will appreciate in light of the present disclosure, that the shock struts described herein may be used in connection with various other vehicles, for example, cars, trucks, busses, trains, boats, and submersible vehicles, or any other vehicle or device, having a shock absorbing strut.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments" "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut comprising:
    a cylinder; and
    a piston assembly disposed radially inward of the cylinder and configured to travel axially within the cylinder in response to the shock strut being in at least one of a first stage region, a transition region or a secondary stage region,
    wherein the piston assembly comprises:
        an outer secondary piston configured to travel axially inward in response to the shock strut being in at least one of the transition region and the secondary stage region; and
        an inner secondary piston configured to travel axially inward in response to the shock strut being in the secondary stage region,
        a primary chamber in fluidic communication with an orifice, wherein the primary chamber and the orifice are configured to dampen compressive loads on the shock strut;
        an engagement strike plate comprising an annulus disposed annularly around an outer periphery of the inner secondary piston and axially outward of the outer secondary piston relative to the cylinder;
        a gas spring chamber metering pin; and
        a floor strike plate,
    wherein the floor strike plate comprises an annulus disposed annularly around an outer periphery of the inner secondary piston and axially inward of the outer secondary piston relative to the cylinder.

2. The shock strut according to claim 1,
    wherein the piston assembly translates a first translation distance in response to a first compression force in the first stage region, wherein the piston assembly translates a second translation distance in response to a second compression force in a second region stage, and wherein ratio of the first compression force to the first translation distance is smaller than the ratio of the second compression force to the second translation distance.

3. The shock strut according to claim 1, wherein the piston assembly comprises a hollow circular tube disposed partially within the cylinder.

4. The shock strut according to claim 1, wherein the inner secondary piston comprises a floor retaining ring comprising an annulus disposed circumferentially outward of the inner secondary piston whereby the inner secondary piston is prevented from becoming separated from the outer secondary piston.

5. The shock strut according to claim 1, wherein the outer secondary piston comprises a primary surface area, wherein the inner secondary piston comprises an inner surface area, and wherein the inner surface area is one of: less than the primary surface area, equal to the primary surface area, or greater than the primary surface area.

6. The shock strut according to claim 1, wherein the piston assembly further comprises:
a gas spring chamber metering pin;
a floor strike plate;

wherein the cylinder comprises:
a secondary chamber in fluid communication with the outer secondary piston and the inner secondary piston; and
an orifice support tube comprising a gas spring chamber, wherein the orifice support tube is positioned centrally within the cylinder and extending axially along a length of the cylinder.

7. The shock strut according to claim 6, wherein the secondary chamber comprises a chamber disposed annularly outward of the gas spring chamber and annularly inward of the cylinder, and wherein at least one of the inner secondary piston and the outer secondary piston may travel axially into the secondary chamber, decreasing a volume of the secondary chamber.

8. The shock strut according to claim 6, wherein the orifice support tube further comprises a first stage limit shelf comprising a thickened annulus portion of the orifice support tube providing a translational stop to the inner secondary piston.

9. A method of operating a shock strut comprising:
applying a first compression force to a primary piston;
compressing the shock strut wherein the compressing includes translating the primary piston axially inward relative to a cylinder;
transferring the first compression force to a fluid disposed within a primary chamber;
expelling the fluid from an orifice in response to the transferring;
contacting an engagement strike plate by the primary piston,
wherein the engagement strike plate comprises an annulus disposed annularly around an outer periphery of an inner secondary piston and axially outward of an outer secondary piston relative to the cylinder;
translating the engagement strike plate axially inward relative to the cylinder in response to the contacting the engagement strike plate by the primary piston;
translating the outer secondary piston axially inward relative to the cylinder in response to the translating the engagement strike plate;
translating a floor strike plate in response to the translating the outer secondary piston; and
contacting the inner secondary piston by the floor strike plate.

10. The method of operating a shock strut according to claim 9 further comprising:
applying a second compression force to the primary piston; and
translating the inner secondary piston in response to the second compression force.

11. The method of operating a shock strut according to claim 10, wherein the second compression force is greater in magnitude than the first compression force.

* * * * *